United States Patent
Moran et al.

(10) Patent No.: US 11,273,020 B2
(45) Date of Patent: Mar. 15, 2022

(54) IMPLANT ANALOGS AND METHODS

(71) Applicant: BIOMET 3I, LLC, Palm Beach Gardens, FL (US)

(72) Inventors: Esther Moran, Green Acres, FL (US); Miguel Montero, Boynton Beach, FL (US); Jorge Londono, Warsaw, IN (US); Isabel Scalise, West Palm Beach, FL (US); Jason Schinis, Warsaw, IN (US); Zachary B. Suttin, West Palm Beach, FL (US)

(73) Assignee: Biomet 3I, LLC, Palm Beach Gardens, FL (US)

( * ) Notice: Subject to any disclaimer, the term of this patent is extended or adjusted under 35 U.S.C. 154(b) by 0 days.

(21) Appl. No.: 15/621,076

(22) Filed: Jun. 13, 2017

(65) Prior Publication Data
US 2018/0353273 A1  Dec. 13, 2018

(51) Int. Cl.
*A61C 13/34* (2006.01)
*A61C 8/00* (2006.01)
*A61C 13/00* (2006.01)
*A61C 9/00* (2006.01)

(52) U.S. Cl.
CPC ............ *A61C 13/34* (2013.01); *A61C 8/0001* (2013.01); *A61C 9/0053* (2013.01); *A61C 13/0019* (2013.01)

(58) Field of Classification Search
CPC .............................. A61C 13/34; A61C 8/0001
USPC ........................................................ 433/213
See application file for complete search history.

(56) References Cited

U.S. PATENT DOCUMENTS

| | | | |
|---|---|---|---|
| 4,955,811 A | 9/1990 | Lazzara et al. | |
| 5,334,024 A | 8/1994 | Niznick | |
| 5,904,483 A * | 5/1999 | Wade | A61C 8/0048 433/173 |
| 6,951,460 B2 * | 10/2005 | Halldin | A61C 8/0072 433/173 |
| 8,185,224 B2 | 5/2012 | Powell et al. | |
| 8,612,037 B2 | 12/2013 | Powell et al. | |
| 8,628,327 B1 * | 1/2014 | Blaisdell | A61C 8/0001 433/213 |
| 8,855,800 B2 | 10/2014 | Powell et al. | |
| 8,926,328 B2 * | 1/2015 | Suttin | A61C 8/0001 433/213 |
| 9,901,379 B2 * | 2/2018 | Reed | A61B 17/8635 |
| 2004/0121287 A1 * | 6/2004 | Morgan | A61C 8/0001 433/173 |
| 2006/0183078 A1 * | 8/2006 | Niznick | A61C 8/0001 433/173 |

(Continued)

FOREIGN PATENT DOCUMENTS

WO   2015046675   4/2015

OTHER PUBLICATIONS

"European Application Serial No. 18177573.5, Partial European Search Report dated Oct. 10, 2018", 11 pgs.

(Continued)

*Primary Examiner* — Matthew M Nelson
(74) *Attorney, Agent, or Firm* — Schwegman Lundberg & Woessner, P.A.

(57) ABSTRACT

Various implant analogs and dental modeling techniques are disclosed herein. The implant analogs are versatile and can be used in traditional modeling techniques or in rapid-prototyping techniques for producing dental models.

16 Claims, 8 Drawing Sheets

(56) References Cited

U.S. PATENT DOCUMENTS

| | | | | |
|---|---|---|---|---|
| 2008/0021477 | A1* | 1/2008 | Strnad | A61B 17/8047 606/287 |
| 2008/0153067 | A1* | 6/2008 | Berckmans | A61C 8/0001 433/213 |
| 2009/0130630 | A1* | 5/2009 | Suttin | A61C 1/084 433/174 |
| 2010/0021859 | A1* | 1/2010 | Kopelman | A61C 8/0001 433/50 |
| 2010/0209877 | A1* | 8/2010 | Hogan | A61C 8/0001 433/214 |
| 2010/0304334 | A1* | 12/2010 | Layton | A61C 13/0004 433/173 |
| 2011/0068571 | A1* | 3/2011 | Choi | F16L 25/0036 285/235 |
| 2011/0262883 | A1 | 10/2011 | Hung | |
| 2011/0294093 | A1* | 12/2011 | Herweg | A61C 8/0001 433/172 |
| 2011/0306014 | A1 | 12/2011 | Conte et al. | |
| 2012/0135370 | A1 | 5/2012 | Ranck et al. | |
| 2012/0141951 | A1 | 6/2012 | Bellanca et al. | |
| 2012/0189981 | A1* | 7/2012 | Powell | B33Y 50/00 433/173 |
| 2012/0214130 | A1 | 8/2012 | Krivoruk | |
| 2012/0225408 | A1* | 9/2012 | Moore | F16B 19/1081 433/174 |
| 2012/0234424 | A1* | 9/2012 | Bernhardt | F16L 33/223 138/137 |
| 2013/0289950 | A1* | 10/2013 | Kopelman | A61C 13/0004 703/1 |
| 2014/0032183 | A1* | 1/2014 | Fisker | A61C 13/0004 703/1 |
| 2014/0272791 | A1* | 9/2014 | Sanchez | A61C 8/0075 433/173 |
| 2015/0017600 | A1 | 1/2015 | Bellanca et al. | |
| 2015/0173862 | A1* | 6/2015 | Suttin | A61C 8/008 433/201.1 |
| 2016/0250008 | A1* | 9/2016 | Brun | A61C 8/0001 433/213 |
| 2016/0262858 | A1* | 9/2016 | Fix | A61C 13/0019 |
| 2017/0086952 | A1* | 3/2017 | Aravena | A61C 13/0004 |
| 2017/0112598 | A1 | 4/2017 | Suttin et al. | |
| 2018/0353267 | A1 | 12/2018 | Montero et al. | |
| 2018/0353273 | A1* | 12/2018 | Moran | A61C 8/0001 |
| 2020/0011367 | A1* | 1/2020 | Sun | F16B 37/068 |

OTHER PUBLICATIONS

"Canadian Application Serial No. 3,008,248, Examiner's Rule 30(2) Requisition mailed Jan. 23, 2019", 5 pgs.

"Australian Application Serial No. 2018204181, First Examination Report dated Jun. 11, 2019", 4 pgs.

"European Application Serial No. 18177573.5, Extended European Search Report dated Jan. 14, 2019", 10 pgs.

"Australian Application Serial No. 2018204181, Response filed Dec. 23, 2019 to First Examination Report dated Jun. 11, 2019", 17 pgs.

"Canadian Application Serial No. 3,008,248, Response filed Mar. 18, 2020 to Office Action dated Nov. 20, 2019", 20 pgs.

"European Application Serial No. 18177573.5, Response Filed Aug. 13, 2019 to Extended European Search Report dated Jan. 14, 2019", 13 pages.

"Canadian Application Serial No. 3,008,248, Office Action dated Nov. 20, 2019", 4 pages.

"U.S. Appl. No. 16/005,003, filed Apr. 7, 2021 to Non Final Office Action dated Jan. 7, 2021", 13 pgs.

"U.S. Appl. No. 16/005,003, Final Office Action dated May 7, 2021", 9 pgs.

"U.S. Appl. No. 16/005,003, Non Final Office Action dated Jan. 7, 2021", 8 pages.

"U.S. Appl. No. 16/005,003, filed Aug. 9, 2021 to Final Office Action dated May 7, 2021", 12 pages.

U.S. Appl. No. 16/005,003, filed Jun. 11, 2018, Combination Impression Coping and Scan Body.

* cited by examiner

IMPLANT ANALOGS AND METHODS

RELATED APPLICATION(S)

This application is related to U.S. Provisional Application Ser. No. 62/518,698, filed Jun. 13, 2017, entitled, "COMBINATION IMPRESSION COPING AND SCAN BODY", the disclosure of which is hereby incorporated by reference herein.

FIELD OF THE DISCLOSURE

The present disclosure relates to various dental implant analogs and methods of use thereof.

BACKGROUND

In dentistry, an implant analog can be used in developing a prosthetic tooth for a patient (e.g., a crown). The implant analog, for example, can be used to develop a digital or real model of a tooth prosthesis for the patient. Frequently, if traditional dental modeling techniques are used to assist in developing the prosthesis (e.g., a gypsum or stone model), a certain implant analog might be used, whereas if more modern modeling techniques are used during the process (e.g., 3D printing), a different implant analog is typically required.

It is therefore an object of the present disclosure to provide improved implant analogs, modeling techniques, and methods for use in creating tooth prostheses.

SUMMARY

To better illustrate the system disclosed herein, a non-limiting list of examples is provided here:

Example 1 includes a dental implant analog comprising a body having an internal bore with a tapered section and a threaded section, the threaded section being positioned apically of the tapered section, and a shaft having a first projection extending outwards from the shaft, the first projection being configured for press-fitting inside a bore of a dental model, or interfacing with flowable dental modeling material that encases the first projection.

Example 2 includes a method of producing a plurality of dental models comprising receiving (i) a digital scan of a first patient's mouth with a first dental implant installed in a jaw of the first patient, and (ii) a dental impression of a second patient's mouth with a second dental implant installed in a jaw of the second patient. The method further comprises selecting first and second implant analogs from a plurality of implant analogs, each of the plurality of implant analogs having a body and a shaft, wherein the shaft includes a first projection extending outwards from the shaft. The method also comprises, with respect to the digital scan: (i) fabricating a first dental model based off the digital scan using an additive manufacturing process, and (ii) inserting the first implant analog into the first dental model. The method further comprises, with respect to the dental impression: (i) attaching the second implant analog to the dental impression, and (ii) pouring a dental modeling material into the dental impression and around the shaft of the second implant analog, including its first projection, to create a second dental model with the second implant analog embedded therein.

Example 3 includes a dental modeling system comprising a plurality of implant analogs, each of the plurality of implant analogs having a body and a shaft, wherein the shaft includes a first projection extending outwards from the shaft, a first dental model with a first of the plurality of implant analogs embedded therein, the first dental model being formed using an additive manufacturing process, and a second dental model with a second of the plurality of implant analogs embedded therein, the second dental model being composed of a flowable, curable dental modeling material, wherein the flowable, curable dental modeling material surrounds the shaft of the second implant analog.

BRIEF DESCRIPTION OF THE FIGURES

The above-mentioned and other features and advantages of this disclosure, and the manner of attaining them, will become more apparent and the disclosure itself will be better understood by reference to the following description of examples taken in conjunction with the accompanying drawings, wherein.

Corresponding reference characters indicate corresponding parts throughout the several views. The exemplifications set out herein illustrate examples of the disclosure, and such exemplifications are not to be construed as limiting the scope of the disclosure any manner.

DETAILED DESCRIPTION

In describing the examples of the disclosure illustrated and to be described with respect to the drawings, specific terminology will be used for the sake of clarity. However, the disclosure is not intended to be limited to any specific terms used herein, and it is to be understood that each specific term includes all technical equivalents.

The present disclosure is directed to implant analogs, modeling techniques, and methods of producing dental prostheses using different manufacturing techniques. The implant analogs can be used in traditional dental modeling techniques (e.g., gypsum or stone models), or in rapid-prototype modeling techniques (e.g., additive manufacturing, 3D printing, etc.) As such, due to the unique characteristics of the implant analogs of the disclosure, such analogs can be used with multiple different modeling techniques to create a dental prosthesis.

Figure 1:
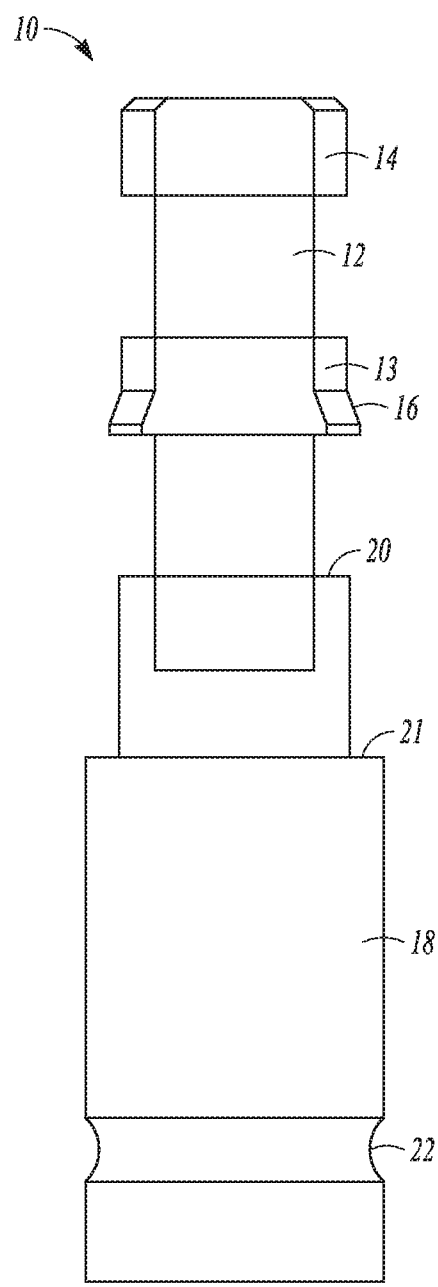
FIG. 1 is a side view of an implant analog, according to an example of the disclosure.
Figure 3:
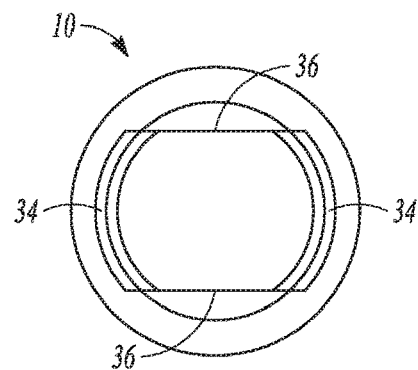
FIG. 3 is an apical-end-view of the implant analog of FIGS. 1-2.

Referring to FIG. 1, implant analog 10 can have a shaft 12 and a body 18. Shaft 12 can have one or more (e.g., a plurality) of projections 13, 14. At least one of projections 13, 14 (e.g., projection 13) can be tapered 16 so as to be able to press-fit within an insert, as described in detail below. As shown in FIG. 3, each projection 13, 14 can have rounded sides 34 and flat sides 36. In addition, a coronal projection 13 can have a larger maximum dimension as measured from a first rounded side 34 to a second rounded side 34 relative to an apical projection 14, or vice versa. For example, as shown in FIGS. 1 and 3, coronal projection 13 can have a larger maximum dimension at taper 16 as compared to apical projection 14.

Figure 2:
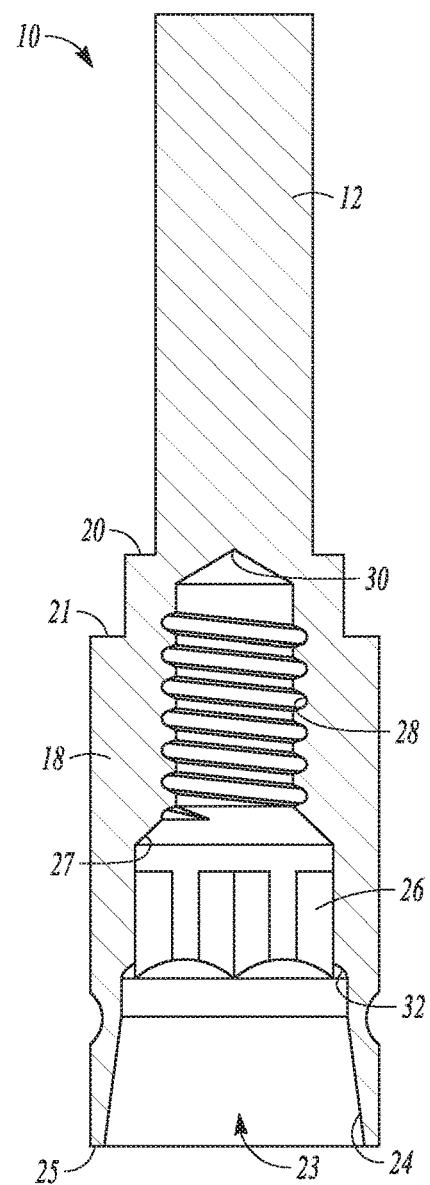
FIG. 2 is a cross-sectional view of the implant analog of FIG. 1.

As shown in FIGS. 1-2, shaft 12 can be connected to body 18 and a step 20 can be formed at the connection. In addition, body 18 itself can have a step 21. Further, body 18 can have a groove 22 formed about part or all of a circumference of body 18. A cavity 23 can be formed in body 18, as shown in FIG. 2. Cavity 23 can have a coronal tapered section 24, a polygonal-shaped or otherwise non-circular section 26, and a threaded section 28. Tapered section 24 can be tapered from a coronal end 25 of implant analog 10 towards an apical end 30 of cavity 23. In an example, tapered section 24 can be tapered by anywhere between about 14-45°. In an example, such a degree taper can configure tapered section 24 to connect with another component (e.g., an impression coping as in FIG. 8 or another restorative component) in a press-fit relationship. A step 32 can be formed at an apical end of tapered section 24, which can lead into polygonal-shaped section 26. In an example, polygonal-shaped section 26 can be square, hexagonal, or any other polygonal or non-circular shape so as to interact with a like-shaped portion of a tool and/or a restorative component (e.g., an abutment, an impression coping, or any other restorative component) in a non-rotational arrangement. For example, a polygon-shaped portion of a tool and/or a restorative component (e.g., an abutment, an impression coping, or any other restorative component) can mate with polygon-shaped section 26 of implant analog 10, such that the tool and/or restorative component is substantially rotationally locked relative to implant analog 10. Moving apically from polygon-shaped section 26, a taper 27 can be formed, which can lead into threaded section 28. Apical end 30 of cavity 23 can be non-threaded, as shown.

Figure 4C:
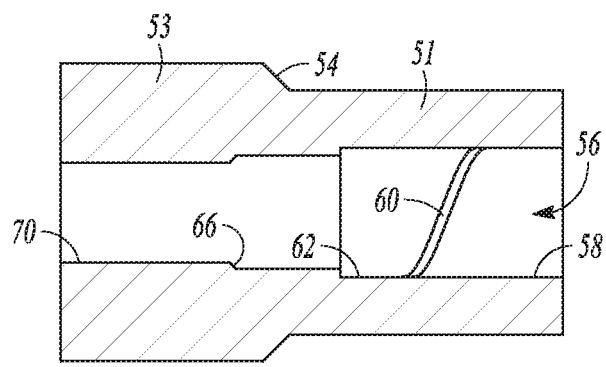
FIG. 4C is a cross-sectional view of the insert of FIG. 4A taken along line 4C-4C, as shown in FIG. 4A.
Figure 4A:
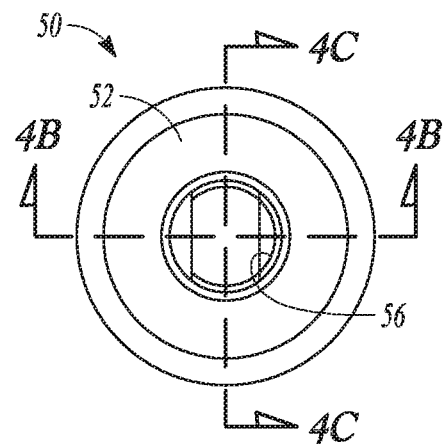
FIG. 4A is a coronal-end-view of an insert used in a dental model, according to an example of the disclosure.
Figure 4B:
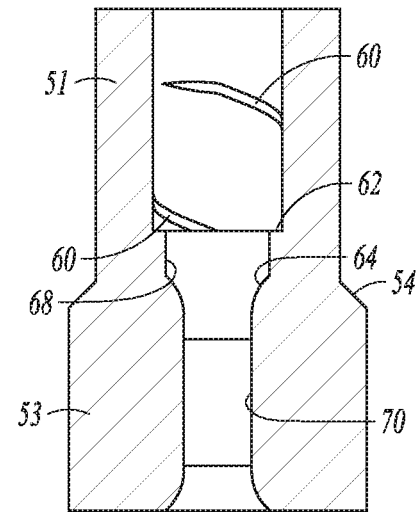
FIG. 4B is a cross-sectional view of the insert of FIG. 4A taken along line 4B-4B, as shown in FIG. 4A.
Figure 5A:
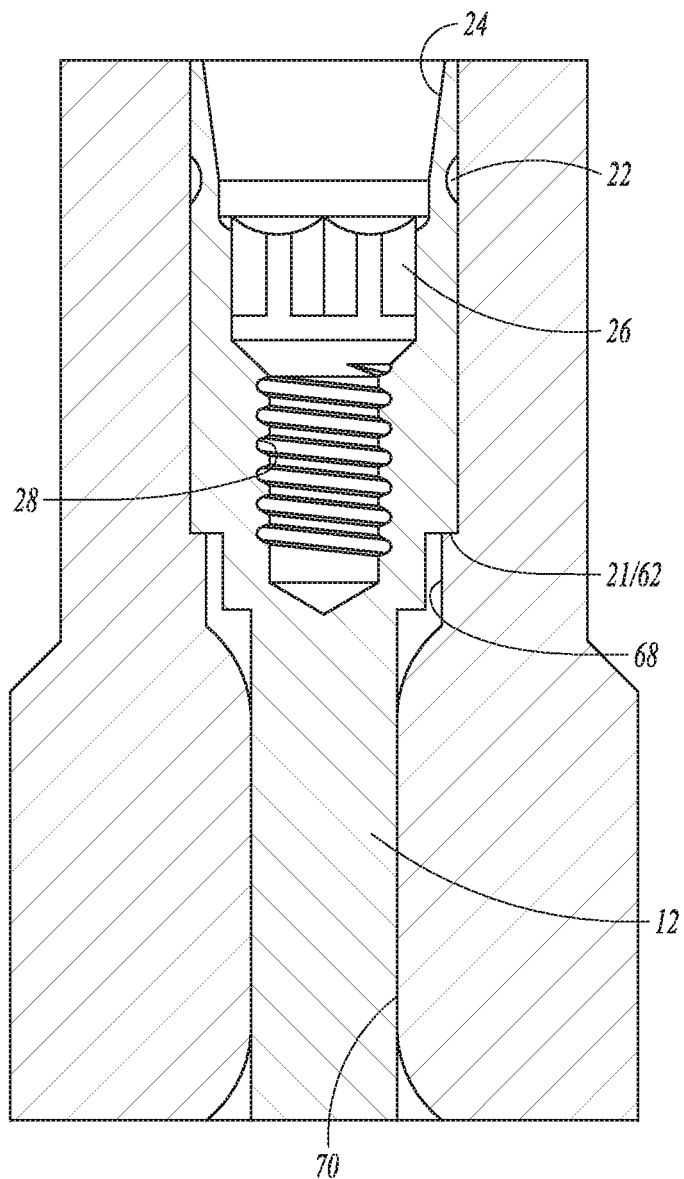
FIG. 5A is a cross-sectional view of the insert of FIGS. 4A-C with the implant analog of FIGS. 1-3 disposed therein.
Figure 5B:
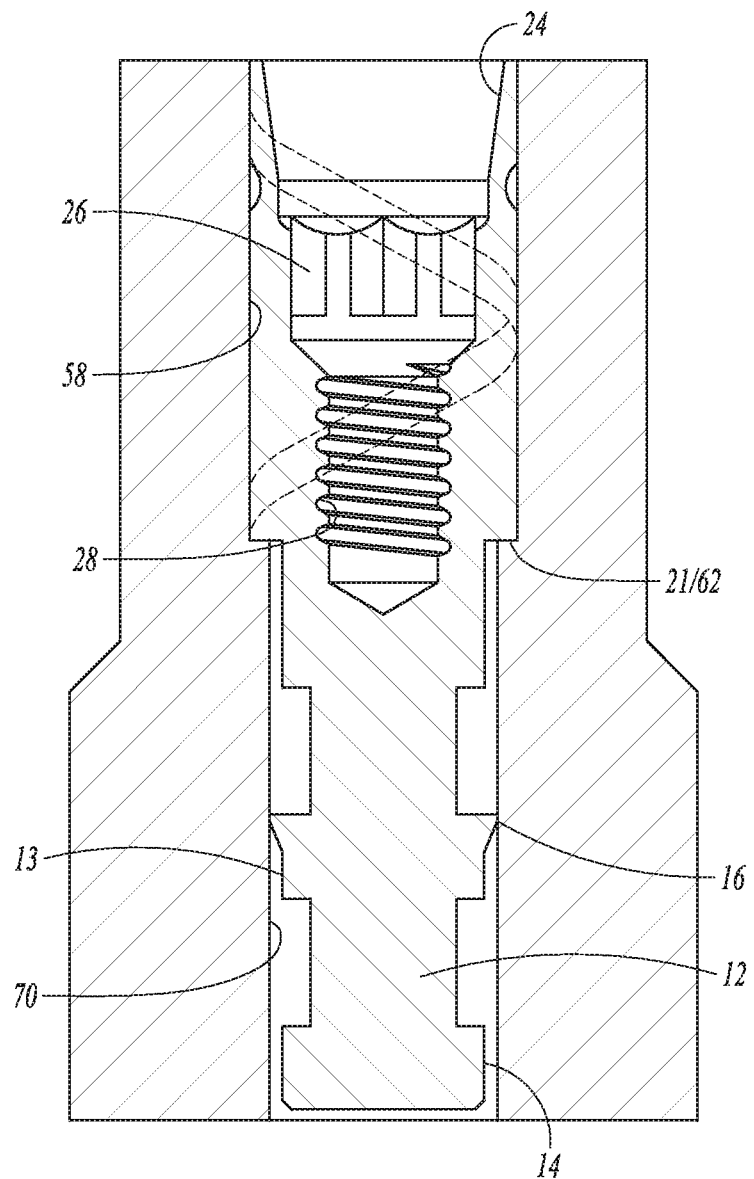
FIGS. 5B-5C are alternate cross-sectional views of the insert and implant analog of FIG. 5A.
Figure 5C:
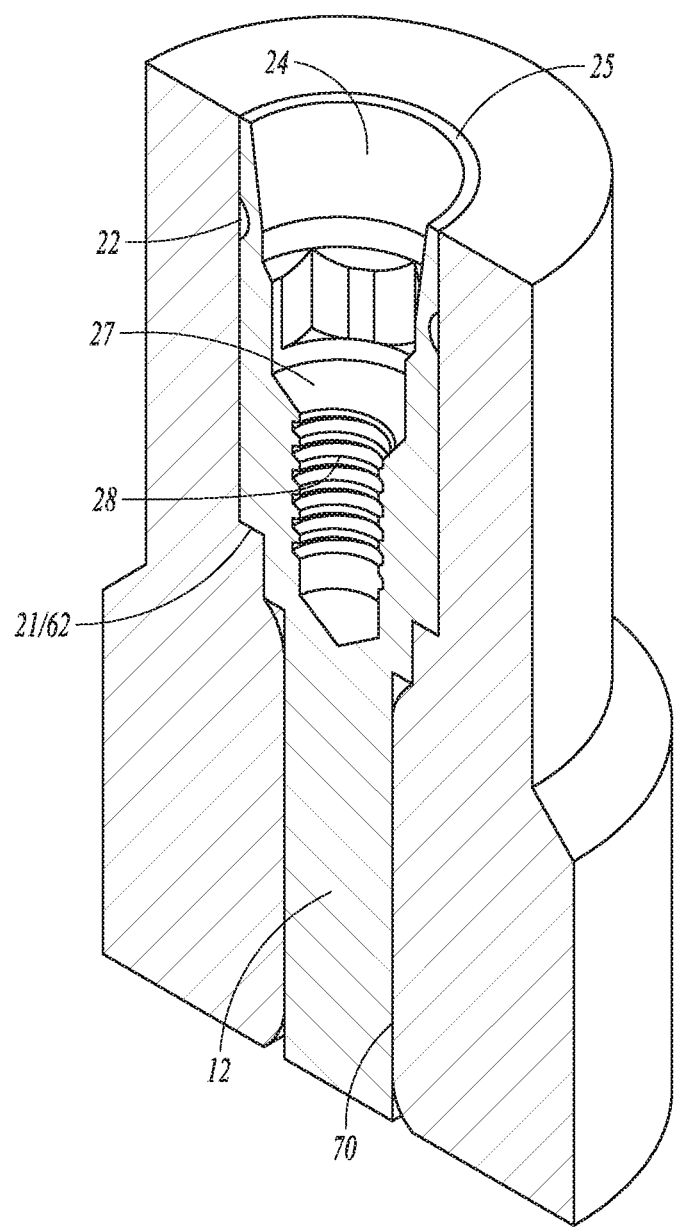
Figure 6:
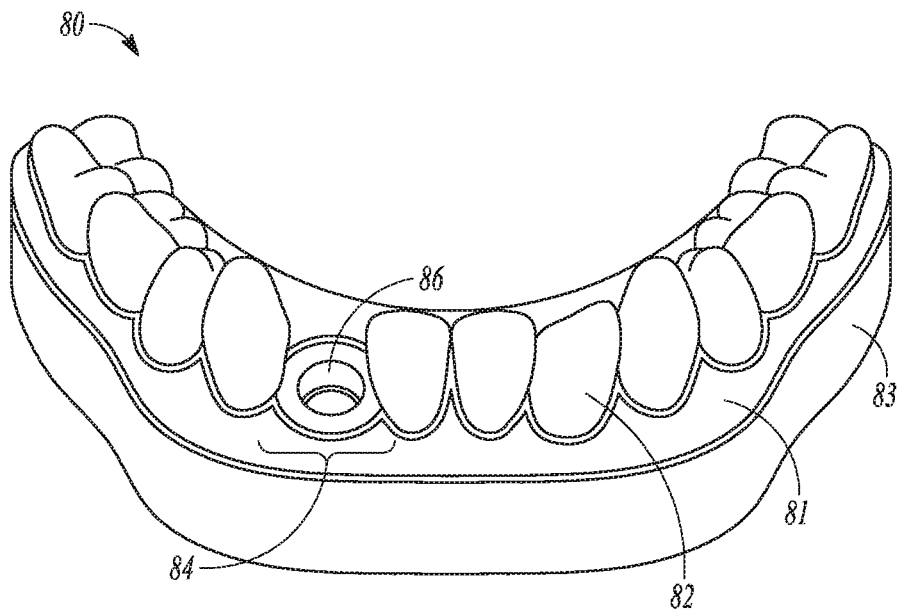
FIG. 6 is a dental model produced using a rapid-prototyping (e.g., additive manufacturing) technique with the insert and implant analog of FIGS. 5A-C disposed therein, according to an example of the disclosure.

FIGS. 4A-C illustrate an insert 50 that can be used with implant analog 10, as shown in FIGS. 5A-C, for placement in a dental model 80 (FIG. 6). Insert 50 can be formed using any additive manufacturing technique, such as 3D printing, selective laser sintering, selective laser melting, Rapid Prototyping (RP), Direct Digital Manufacturing (DDM), and/or any other additive manufacturing technique. Thus, as detailed below, insert 50 is suitable for use in a dental model 80 that is produced using additive manufacturing.

Still referring to FIGS. 4A-C, insert 50 can have a body 52 with a smaller diameter coronal section 51, and a relatively larger-diameter apical section 53. A step 54, which can be tapered, can be formed between sections 51, 53. Insert 50 can have an internal bore 56, which can have a larger-diameter section 58, an intermediate-diameter section 68 with a diameter that can be smaller than the larger-diameter section 58, and a smaller-diameter section 70 with a diameter that can be smaller than the larger-diameter and intermediate-diameter sections 58, 68. In an example, larger-diameter section 58 of internal bore 56 can have a protrusion 60. Protrusion 60 can form a helix along larger-diameter section 58, and can be configured to form a press-fit with implant analog 10 once disposed within insert 50, as described below.

As shown in FIGS. 4B-C, a first step 62 can be formed along bore 56 of insert 50 between larger-diameter section 58 and intermediate-diameter section 68, a second step (e.g., a rounded step) 64 can be formed between intermediate-diameter section 68 and smaller-diameter section 70, and a third step 66 can be formed along bore 56 of insert 50 within smaller-diameter section 70.

FIGS. 5A-C illustrate implant analog 10 disposed inside bore 56 of insert 50. As shown, implant analog 10 can be inserted inside bore 56 of insert 50, such that its shaft 12 resides in smaller-diameter section 70 of bore 56, and coronal projection 13 contacts the wall defining bore 56 within smaller-diameter section 70. In an example, coronal projection 13 can contact bore 56 within smaller-diameter section 70 to establish a press-fit in that area. For instance, tapered part 16 of coronal projection 13 of shaft 12 can engage with the wall of bore 56 in smaller-diameter section 70 and establish a press-fit or interference-fit. In an example, a maximum dimension of coronal projection 13 taken at tapered part 16 can be slightly greater than a maximum dimension of bore 56 of insert 50 taken at smaller-diameter section 70, thereby establishing a press-fit or interference-fit in that area. In another example, apical projection 14 can have a smaller maximum dimension than the maximum dimension of coronal projection 13 and, thus, not contact or establish a press-fit with the wall of bore 56 of insert 50 at smaller-diameter section 70. For instance, rounded sides 34 of apical projection 14 can be spaced apart from the wall of bore 56 at smaller-diameter section 70, as shown in FIG. 5B.

Referring to FIG. 5A, a section of body 18 of implant analog 10 apical of step 21 can be positioned in intermediate-diameter section 68 of bore 56 of insert 50, and the remainder of body 18 of implant analog 10 can be positioned in larger-diameter section 58. In addition, step 21 of body 18 of implant analog 10 can rest on first step 62 inside bore 56 of insert 50, which can prevent implant analog 10 from moving further apically within bore 56 of insert 50. Referring to FIG. 5B, body 18 of implant analog 10 can also establish a press-fit or interference-fit within larger-diameter section 58 of bore 56 of insert 50. In an example, the press-fit or interference-fit can be established by an interaction between protrusion 60 and body 18 of implant analog 10. For instance, since protrusion 60 can wrap helically around bore 56 of insert 50 within larger-diameter section 58, it can establish a cross-sectional area or dimension that is slightly smaller than a cross-sectional dimension of body 18 of implant analog 10. Thus, as body 18 of implant analog 10 is inserted into larger-diameter section 58 of bore 56 of insert 50, due to its slightly-larger cross-sectional dimension, body 18 can engage with protrusion 60 and establish a press-fit or interference-fit. With implant analog 10 disposed inside insert 50, as shown in FIGS. 5A-C, other dental restorative components (e.g., impression copings, scan bodies, abutments, or other components) can be attached to implant analog 10, as detailed more fully below, to assist in producing a dental prosthesis for a patient.

FIG. 6 illustrates a dental model 80 that can be manufactured using any additive manufacturing technique disclosed herein, such as 3D printing, selective laser sintering, selective laser melting, Rapid Prototyping (RP), Direct Digital Manufacturing (DDM), and/or any other technique. Dental model 80 can include modeled teeth 82, an insert site 84, and a cavity 86 for receiving an insert. Dental model 80 can be used to develop a dental prosthesis (e.g., a custom dental prosthesis) for a patient.

Figure 7:
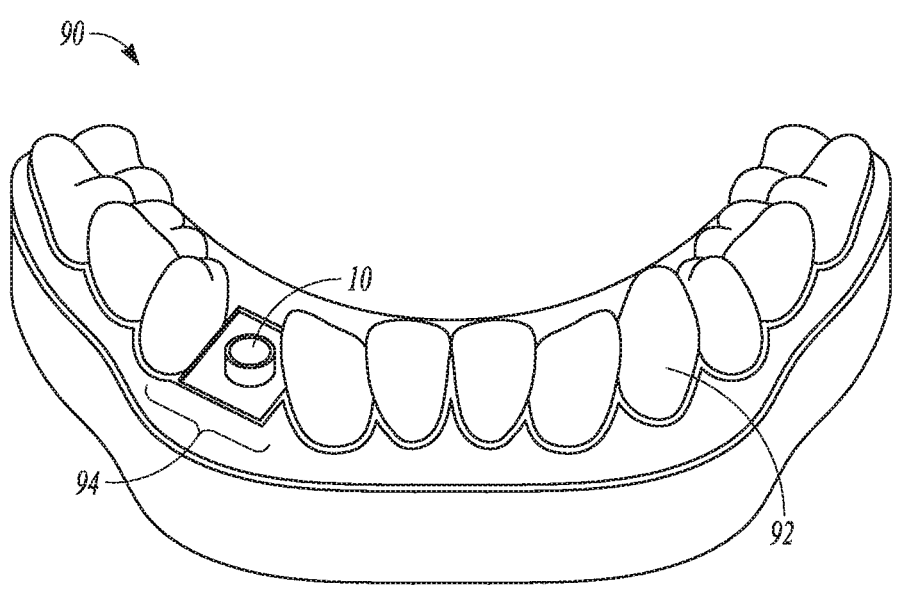
FIG. 7 is a traditional dental model with the implant analog of FIGS. 1-3 disposed therein, according to an example of the disclosure.

FIG. 7 illustrates a dental model 90 that can be manufactured using more traditional techniques, such as by forming a gypsum or stone model from a dental impression. For example, as detailed more fully below, a dental impression can be taken of a patient's mouth, and then a gypsum or stone model can be fabricated from the dental impression, similar to dental model 90. As shown in FIG. 7, dental model 90 can have model teeth 92 and an insert site 94 with implant analog 10 implanted at insert site 94. Dental model 90 can be used to develop a dental prosthesis (e.g., a custom dental prosthesis) for a patient.

Figure 8:
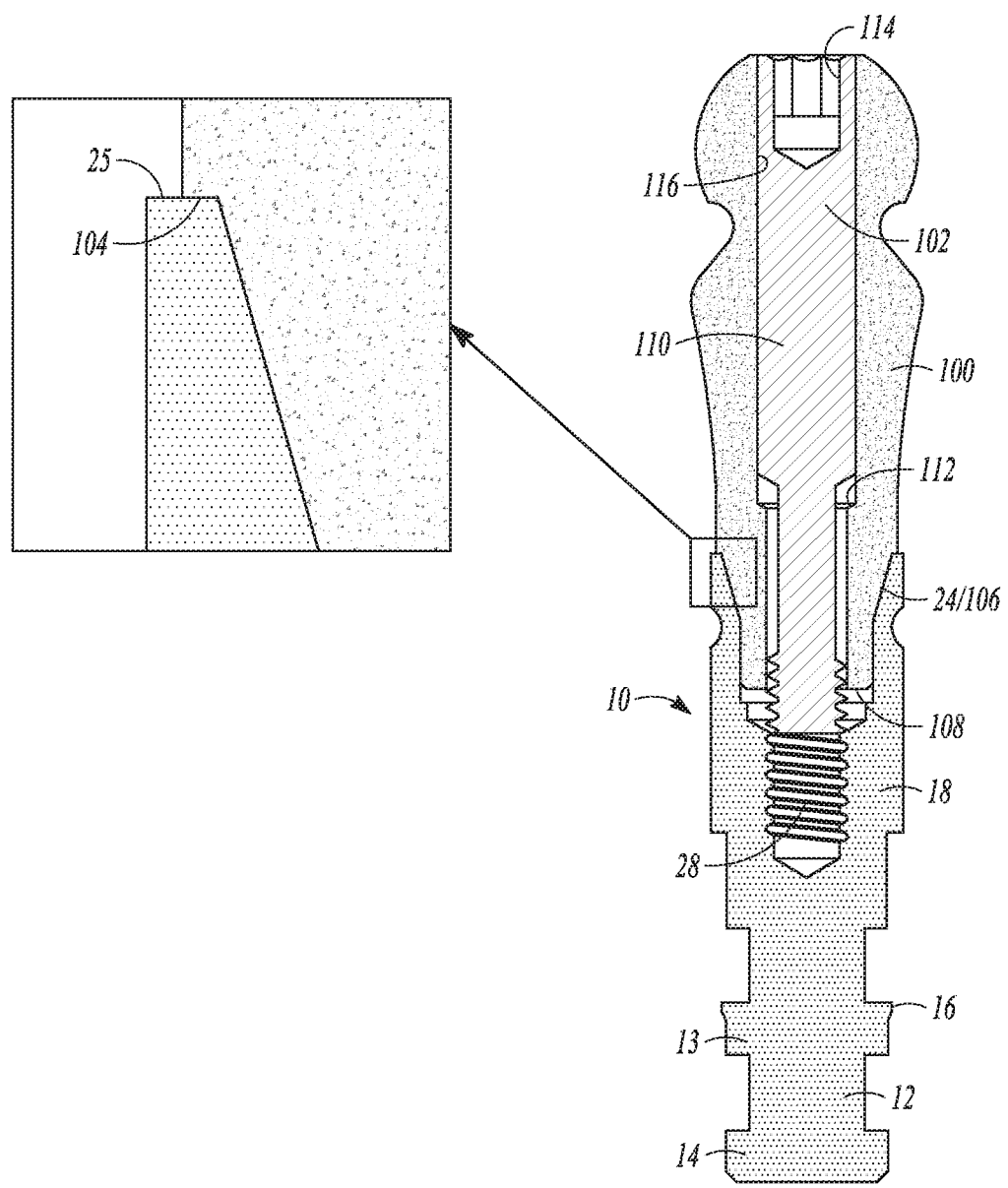
FIG. 8 is a cross-sectional view of the implant analog of FIGS. 1-3 with an impression coping attached to the analog.

FIG. 8 illustrates an impression coping 100 attached to implant analog 10. Of course, other dental components (e.g., scan bodies, abutments, etc.) can be attached to implant analog 10 in a similar manner. Impression coping 100 can be any of the impression copings disclosed in a co-pending application Ser. No. 62/518,698 and titled "Impression Coping and Scan Bodies" (filed concurrently herewith), the disclosure of which is hereby incorporated by reference herein ("the M13 Application"). As shown, impression coping 100 can have an internal bore 116 that accepts a screw or other fixation member 102 for attaching coping 100 to implant analog 10. Screw 102 can be threaded into threaded section 28 of implant analog 10, and can have a head 110 that can engage with an internal ledge 112 to draw coping 100 towards implant analog 10. Screw 102 can also have a polygon-shaped or non-circular opening 114 for engaging with part of a tool to drive screw 102 into implant analog 10. Impression coping 100 can have a tapered section 106 that can engage with tapered section 24 of implant analog 10. In an example, the engagement between tapered sections 106, 24 can establish a press-fit or interference-fit between coping 100 and implant analog 10. Further, impression coping 100 can have a ledge 104 that can contact coronal end 25 of implant analog 10 to prevent coping 100 from traveling further apically within cavity 23 of implant analog 10. As described in the M13 Application, impression coping 100 can also act as a scan body.

Of course, as noted above it is contemplated that a number of other dental components can be attached to implant analog 10 similar to impression coping 100. For instance, such components can include an abutment that can have an internal bore (e.g., for use with screw 102), and/or a tapered external surface that can establish a press-fit or interference-fit with tapered section 24 of implant analog 10. The abutment can also have a ledge similar to ledge 104 of impression coping 100. In an example, the abutment can be any abutment disclosed in U.S. Patent Pub. No. 2014/0272791 ("the '791 Publication"), the disclosure of which is hereby incorporated by reference herein in its entirety, or any other suitable dental abutment.

Likewise, a separate scan body can be provided that can attach to implant analog 10 similar to impression coping 100. For instance, the scan body can have an internal bore (e.g., for use with screw 102), and/or a tapered external surface that can establish a press-fit or interference-fit with tapered section 16 of implant analog 10. The scan body can also have a ledge similar to ledge 104 of impression coping 100. Other dental components are also contemplated for attachment with implant analog 10.

Several exemplary methods of using implant analog 10 along with other dental components are now described. As disclosed, implant analog 10 can be used in additive manufacturing/rapid-prototyping procedures for producing a dental prosthesis, or in more traditional techniques for producing a dental prosthesis.

In a first exemplary method, implant analog 10 can be used in an additive manufacturing/rapid-prototyping process to develop a custom dental prosthesis for a patient. For instance, first an appropriate dental implant can be installed in a patient's jawbone. In an example, the dental implant can be any dental implant disclosed in the '791 Publication, or any other suitable dental implant. In an example, a healing abutment can be attached after the implant is implanted. For instance, any of the encoded healing abutments disclosed in U.S. Patent Pub. No. 2015/0173862 ("the '862 Publication"), the disclosure of which is hereby incorporated by reference herein, can be attached to the implant. As disclosed, the healing abutments of the '862 Publication can be scanned by a scanner for purposes of preparing a custom prosthesis.

After implantation of the dental implant and/or some healing, a patient's mouth can then be scanned using a 3D scanner to capture data about the patient's teeth, soft tissue, and/or other dental structures and the dental implant. For example, the dental implant with or without an encoded healing abutment as described in the '862 Publication, or with or without a different scan body attached, can be scanned using a 3D scanner to capture data about the location and/or angular position of the dental implant in the patient's jaw. Indeed, in an example, another scanning body besides the encoded healing abutment disclosed in the '862 Publication can be attached to the dental implant and scanned along with the patient's other dental structures to capture data about the location and/or angular position of the dental implant in the patient's jaw (and any surrounding dental structures, such as teeth, soft tissue, etc.)

The data from the above-mentioned scan can then be transferred to a computer modeling program (e.g., a CAD program) to develop a digital model of the patient's mouth, for instance the patient's teeth, soft tissue, jaw structures, and/or the dental implant installed in the patient's jaw. An example of such a digital modeling process is disclosed in U.S. Pat. Nos. 8,185,224, 8,612,037, and 8,855,800, the disclosures of which are hereby incorporated by reference herein in their entireties. The digital model can then be transferred to an additive manufacturing/rapid prototyping machine to produce a real-world model corresponding to the digital model disclosed above. In an example, a 3D printer, a CNC machine, or any other additive manufacturing or rapid-prototyping machine can be used to create the real-world model from the digital model. An exemplary dental model 80 is shown in FIG. 6.

Dental model 80 can be of only a section of a patient's dental structures, although alternatively all of the patient's dental structures can be produced in model. As such, dental model 80 can include models of the patient's teeth 82 created from the above-disclosed digital model, models of the patient's soft tissue 81, and/or models of portions or all of the patient's jaw 83. Dental model 80 can also include an insert site 84 at a location where the dental implant was installed in the patient. Insert site 84 can include a cavity 86 designed to receive insert 50 of FIGS. 4A-C, or alternatively cavity 86 of insert site 84 can be designed in the additive manufacturing process to become insert 50. In other words, through the additive manufacturing process, cavity 86 of insert site 84 can be designed with an internal bore that has the same shape as internal bore 56 of insert 50.

Subsequently, depending upon the type and/or size of the implant inserted into the patient, an appropriate implant analog from a system or kit of implant analogs 10 can be selected for insertion into cavity 86 of insert site 84 of dental model 80. The particular implant analog 10 having the appropriate size can then be press-fit into the internal bore of cavity 86 (e.g., if it is designed as insert 50), or into internal bore 56 of insert 50 if insert 50 is a separate component that is inserted into cavity 86. Either way, implant analog 10 can be press-fit within an internal bore that has the same shape as internal bore 56 of insert 50. In an example, as shown in FIG. 5B, tapered part 16 of apical projection 14 can engage with smaller-diameter section 70 of internal bore 56 to establish a press-fit or interference-fit at that location, and projection 60 can engage with body 18 of implant analog 10 to establish a press-fit or interference-fit between body 18 and insert 50. Of course, as noted previously, other connection mechanisms can be used between implant analog 10 and insert 50.

With implant analog 10 inside of insert site 84 of dental model 80, other components can be attached to implant analog 10 to develop a custom prosthesis for the patient. For example, a scan body can be attached to implant analog 10, which can be scanned using a 3D scanner or other scanner. Based on information gained from the scan, a digital model of a custom prosthesis (e.g., a custom abutment, a custom crown, or other custom prosthetic component) can be created. For example, the development of a custom prosthesis using 3D scanning techniques is described in U.S. Pat. Nos. 8,185,224, 8,612,037, and 8,855,800, the disclosures of which are hereby incorporated by reference herein in their entireties. Thus, implant analog 10 can be used in an additive manufacturing/rapid-prototyping technique to develop a custom prosthesis for a patient. The additive manufacturing/rapid-prototyping technique can allow quick production of a dental model and corresponding custom prosthetic.

Another exemplary method involves using implant analog 10 in more traditional dental modeling techniques. For example, implant analog 10 can be used in creating a gypsum or stone model, similar to dental model 90 shown in FIG. 7. The exemplary method can encompass first implanting a dental implant in the jaw of a patient, as detailed above with respect to the first exemplary method. The dental implant can be any suitable dental implant, including any of the dental implants disclosed in the '791 Publication. Then, an impression coping can be attached to the dental implant for taking a dental impression of the patient's mouth, including the patient's teeth, soft-tissue, and/or jaw structures. A suitable impression coping, which can also act as a scan body, is disclosed in the M13 Application, incorporated by reference above. With the impression coping attached to the implant, a dental impression can be made of the patient's mouth including the implant/impression coping site. As discussed in the M13 Application, the dental impression can be an open-tray or closed-tray impression.

Subsequently, a suitable implant analog from a system or kit of implant analogs 10 can be selected and attached to a component engaged with the dental impression, for example the above-discussed impression coping. For instance, as shown in FIG. 8, an impression coping 100 can be attached to implant analog 10 using a screw 102 that is screwed into threaded part 28 of cavity 23 of implant analog 10. Impression coping 100 can be an impression coping from the M13 Application. Thus, impression coping 100 can have an apical end 108 and a tapered section 106 that can engage with tapered section 24 of cavity 23 of implant analog 10. Such engagement can establish a press-fit or interference fit between coping 100 and implant analog 10. In addition, impression coping 100 can have a ledge 104 that can seat on coronal end 25 of implant analog 10 to prevent impression coping 100 from moving further apically relative to implant analog 10. The remainder of the features of impression coping 100 including its use in taking a dental impression, as well as acting as a scan body, are disclosed in detail in the M13 Application.

Although not shown in FIG. 8, it is contemplated for purposes of the present disclosure that impression coping 100 can be embedded in a dental impression with implant analog 10 extending out of the dental impression so that a suitable dental model can be created. As an example, a suitable dental modeling material (e.g., gypsum or stone) can be poured into the above-disclosed dental impression to create a positive dental model of the patient's teeth, soft tissue, and/or jaw structures. The dental modeling material can be poured into the negative impression created by way of the dental impression to generate a positive dental model, as shown, for example, in FIG. 7. The dental modeling material can be allowed to harden to produce a traditional dental model 90, as illustrated in FIG. 7. Dental model 90 can be a gypsum or stone model, or any dental model made using traditional dental modeling material. During creation of model 90, the dental modeling material can flow around shaft 12 and body 18 of implant analog 10, including coronal and apical projections 13, 14 and groove 22, and can solidify. As such, when dental model 90 is removed from the dental impression disclosed above, impression coping 100 can be detached from implant analog 10 and implant analog 10 can remain with dental model 90, as shown in FIG. 7. Coronal and apical projections 13, 14 and groove 22 can assist with securing implant analog 10 to dental model 90 as the hardening process occurs, since as discussed the dental modeling material can flow into and/or around these sites and harden to create a secure connection.

In an example, although not shown in FIG. 8, impression coping 100 can also remain attached to implant analog 10 when the dental impression is removed from dental model 90. For instance, as described in the M13 Application, if a closed-tray dental impression is used, when the dental impression is removed from dental model 90, impression coping 100 and implant analog 10 can remain with dental model 90. In this instance, impression coping 100 can remain to be used as a scan body, as disclosed below.

Next, a custom prosthesis can be developed using dental model 90. For instance, a suitable scan body can be attached to implant analog 10, which can be impression coping 100 disclosed above, or another appropriate scan body. Dental model 90 and the scan body can then be scanned using a 3D scanner or another scanning device to digitize dental model 90 at the site of implant analog 10 and begin to digitally produce the custom prosthesis. A suitable process for creating a custom prosthesis by scanning a scan body and then digitally modeling the custom prosthesis is described in detail in the '224, '037, and/or '800 Patents, incorporated by reference above. The custom prosthesis (e.g., abutment, crown, etc.) can then later be attached to the patient's actual implant so that the tooth replacement can be finished.

It will be readily understood to those skilled in the art that various other changes in the details, material, and arrangements of the parts and method stages which have been described and illustrated in order to explain the nature of the inventive subject matter can be made without departing from the principles and scope of the inventive subject matter as expressed in the subjoined claims. For example, the order of method steps or stages can be altered from that described above, as would be appreciated by a person of skill in the art.

It will also be appreciated that the various dependent claims, examples, and the features set forth therein can be combined in different ways than presented above and/or in the initial claims. For instance, any feature(s) from the above examples can be shared with others of the described examples, and/or a feature(s) from a particular dependent claim may be shared with another dependent or independent claim, in combinations that would be understood by a person of skill in the art.

What is claimed is:

1. A dental modeling system comprising:
a plurality of implant analogs, each of the plurality of implant analogs having a body and a shaft, wherein the shaft connects to an apical end of the body via a first step, wherein the shaft has a longitudinal axis and includes a first projection extending outwards from the shaft and a second projection extending outwards of the shaft, wherein the second projection is spaced along the longitudinal axis from the first projection and the body and is positioned at an apical end of the shaft, wherein the first projection is spaced along the longitudinal axis of the shaft from the second projection, the first step and the body, wherein at least one of the first projection and second projection have a first rounded side and a second rounded side that opposes the first rounded side across a diameter of the shaft therefrom, and wherein the body forms a coronal portion of each of the plurality of implant analogs, has a second step and has a groove therein formed about part or all of a circumference thereof, wherein the groove is positioned relatively more adjacent a coronal end of the body than to the shaft and the second step; and
a first dental model having an insert with an internal bore configured to receive one of the plurality of implant analogs, wherein a wall of the insert that defines the bore has a larger diameter section configured to receive the body of the one of the plurality of implant analogs and a smaller diameter section configured to receive the shaft;
wherein the first projection and the wall along the smaller diameter section are configured to create a first interference-fit between the insert and the one of the plurality of implant analogs, and wherein the body and groove are configured to be received in the larger diameter section of the internal bore and the groove is configured to assist each of the plurality of implant analogs with securing to the first dental model.

2. The dental modeling system of claim 1, wherein the wall of the insert that defines the larger diameter section and the body are configured to create a second interference-fit between the insert and the one of the plurality of implant analogs.

3. The dental modeling system of claim 2, wherein the second interference fit is formed by one of a helical protrusion along the wall of the insert in the larger diameter section engaging the body or a portion of the wall of the insert being received in the groove.

4. The dental modeling system of claim 1, wherein each of the plurality of implant analogs further comprises an internal bore within the body, the internal bore with a tapered section and a threaded section, the threaded section being positioned apically of the tapered section.

5. The dental modeling system of claim 4, wherein the tapered section is tapered by between about 14-45 degrees.

6. The dental modeling system of claim 4, wherein the internal bore further comprises a polygon-shaped recess positioned between the tapered section and the threaded section.

7. The dental modeling system of claim 6, wherein the groove along the circumference of the body is located coronal of the polygon-shaped recess of the internal bore.

8. The dental modeling system of claim 4, wherein the first projection and the second projection each have a pair of flat sides that define the first projection and the second projection in combination with the first rounded side and the second rounded side.

9. The dental modeling system of claim 1, wherein the first projection of each of the plurality of implant analogs has a tapered surface, and the tapered surface of the first projection of the first implant analog is configured to be engaged with the wall to establish the first interference-fit.

10. A dental modeling system comprising:
a plurality of implant analogs, each of the plurality of implant analogs having a body and a shaft, wherein the body is coronal of the shaft and is connected to the shaft by a first step, wherein the body forms a coronal portion of each of the plurality of implant analogs, has a second step and a groove therein, wherein the groove is located relatively more adjacent a coronal end than to the shaft and the second step, the groove extending about part or all of a circumference of the body, wherein the shaft has a longitudinal axis and includes a first projection extending outwards from the shaft and a second projection extending outwards of the shaft, wherein the second projection is spaced along the longitudinal axis from the first projection and the body and is positioned at an apical end of the shaft, wherein the first projection is spaced along the longitudinal axis of the shaft from the second projection, the first step and the body, and wherein at least one of the first projection and second projection have a first rounded side and a second rounded side that opposes the first rounded side across a diameter of the shaft therefrom; and
a first dental model having an insert with an internal bore configured to receive one of the plurality of implant analogs, wherein a wall of the insert that defines the bore has a larger diameter section configured to receive the body of the one of the plurality of implant analogs and a smaller diameter section configured to receive the shaft, wherein the larger diameter section has a helical protrusion along the wall thereof;
wherein at least one of the first projection and the second projection have a taper along the first rounded side and the second rounded side, and wherein when the taper engages the wall along the smaller diameter section whereby the taper and the wall along the smaller diameter section are configured to create a first interference-fit between the insert and the one of the plurality of implant analogs; and
wherein the wall of the insert that defines the larger diameter section and the body are configured to create a second interference-fit between the insert and the one of the plurality of implant analogs.

11. The dental modeling system of claim 10, wherein each of the plurality of implant analogs further comprises an internal bore within the body, the internal bore with a tapered section and a threaded section, the threaded section being positioned apically of the tapered section.

12. The dental modeling system of claim 11, wherein the tapered section is tapered by between about 14-45 degrees.

13. The dental modeling system of claim 11, wherein the internal bore further comprises a polygon-shaped recess positioned between the tapered section and the threaded section.

14. The dental modeling system of claim 13, wherein the groove along the circumference of the body is located coronal of the polygon-shaped recess of the internal bore.

15. The dental modeling system of claim 11, wherein the first projection and the second projection each have a pair of flat sides that define the first projection and the second projection in combination with the first rounded side and the second rounded side.

16. The dental modeling system of claim 10, wherein the first projection is tapered, and the taper is configured to be engaged with the wall to establish the first interference-fit.

\* \* \* \* \*